(12) United States Patent
Xu et al.

(10) Patent No.: US 8,653,931 B2
(45) Date of Patent: Feb. 18, 2014

(54) MULTI-PHASE POWER CONVERTERS AND INTEGRATED CHOKE THERFOR

(75) Inventors: David Dewei Xu, Pickering (CA); Ning Zhu, Toronto (CA); Yuan Xiao, Kitchener (CA); Bin Wu, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/913,455

(22) Filed: Oct. 27, 2010

(65) Prior Publication Data
US 2012/0106210 A1 May 3, 2012

(51) Int. Cl.
*H01F 27/24* (2006.01)

(52) U.S. Cl.
USPC .......................................................... 336/234

(58) Field of Classification Search
USPC ............. 336/65, 83, 170, 173, 180–184, 212, 336/234, 214–215, 178
See application file for complete search history.

(56) References Cited

U.S. PATENT DOCUMENTS

| | | | |
|---|---|---|---|
| 1,150,416 A * | 8/1915 | Bogen et al. | 307/58 |
| 2,702,887 A * | 2/1955 | Joublanc | 336/5 |
| 4,134,055 A | 1/1979 | Akamatsu | |
| 4,156,897 A * | 5/1979 | Vigh et al. | 363/126 |
| 4,910,482 A | 3/1990 | Takagai et al. | |
| 4,975,670 A * | 12/1990 | Krinickas, Jr. | 336/60 |
| 5,083,101 A | 1/1992 | Frederick | |
| 5,155,676 A | 10/1992 | Spreen | |
| 5,313,176 A | 5/1994 | Upadhyay | |
| 5,319,343 A | 6/1994 | Jeffries | |
| 5,321,373 A | 6/1994 | Shusterman et al. | |
| 5,581,224 A | 12/1996 | Yamaguchi | |
| 5,686,806 A | 11/1997 | Hibbard | |
| 5,731,666 A | 3/1998 | Folker et al. | |
| 5,990,654 A | 11/1999 | Skibinski et al. | |
| 6,617,950 B2 | 9/2003 | Gilmore et al. | |
| 6,642,672 B2 | 11/2003 | Hu et al. | |
| 6,768,408 B2 | 7/2004 | Gilmore et al. | |
| 6,917,271 B2 | 7/2005 | Zhang et al. | |
| 7,142,081 B1 | 11/2006 | Shudarek | |
| 7,274,576 B1 | 9/2007 | Zargari et al. | |
| 7,535,125 B2 | 5/2009 | Shudarek | |
| 7,623,016 B2 | 11/2009 | Shudarek et al. | |
| 7,768,373 B2 * | 8/2010 | Shudarek | 336/212 |
| 2004/0135661 A1 | 7/2004 | Haugs et al. | |
| 2006/0061325 A1 | 3/2006 | Tang et al. | |
| 2006/0152324 A1 | 7/2006 | Haugs et al. | |

(Continued)

FOREIGN PATENT DOCUMENTS

| | | |
|---|---|---|
| AU | 2006201301 A1 | 11/2006 |
| CA | 2541211 A1 | 11/2006 |
| WO | WO2009131602 A1 | 10/2009 |

OTHER PUBLICATIONS

International Search Report and Written Opinion of Application No. PCT/US08/87251 dated Feb. 3, 2009.

(Continued)

*Primary Examiner* — Tuyen Nguyen
(74) *Attorney, Agent, or Firm* — Fay Sharpe LLP; Alexander Kuszewski; John M. Miller

(57) ABSTRACT

Power conversion systems and integrated multi-phase chokes providing high common mode to differential mode choke inductance ratios with circular and triangular shapes for concurrent differential filtering and common-mode voltage blocking in motor drives and other power conversion applications.

26 Claims, 12 Drawing Sheets

(56) References Cited

U.S. PATENT DOCUMENTS

| | | |
|---|---|---|
| 2006/0220777 A1 | 10/2006 | Nakahori |
| 2006/0250207 A1 | 11/2006 | Shudarek |
| 2007/0115087 A1 | 5/2007 | Lee et al. |
| 2008/0074227 A1 | 3/2008 | Chen et al. |
| 2009/0256419 A1 | 10/2009 | Anghel et al. |
| 2009/0261939 A1 | 10/2009 | Shudarek |
| 2009/0322081 A1 | 12/2009 | Wagoner et al. |
| 2009/0322082 A1 | 12/2009 | Wagoner et al. |

OTHER PUBLICATIONS

Dudi A. Rendusara, E. Cengelci, Prasad N. Enjeti, Victor R. Stefanovic, James W. Gray, "Analysis of common mode voltage—"Neutral Shift" in medium voltage PWM adjustable speed drive (MV-ASD) Systems", 2000 IEEE.

Tamas Kerekes, Remus Teodorescu, Marco Liserre, Christian Klumpner, and Mark Sumner, "Evalutation of three-phase transformerless photovoltaic inverter topologies", 2009 IEEE.

Rober M. Cuzner, Daniel J. Nowak, Ashish Bendre, Giovanna Oriti, and Alexander L. Julian, "Mitigating circulating common-mode currents between parallel soft-switched drive systems", 2007 IEEE.

Hirofumi Akagi and Takafumi Doumoto, "An approach to eliminating high-frequency shaft voltage and ground leakage current from an inverter-driven motor", 2004 IEEE.

Juergen K. Steinke, "Use of an LC filter to achieve a motor-friendly performance of the PWM voltage source inverter", 1997 IEEE.

* cited by examiner

MULTI-PHASE POWER CONVERTERS AND INTEGRATED CHOKE THERFOR

BACKGROUND

Power conversion systems are used in a variety of industrial machines and utilities to convert electrical power from one form to another for powering electric motors, converting AC power from a wind driven generator to supply power to a grid, etc. Many power conversion systems have multiple converter stages, such as AC/DC/AC drives for electric motors having a pulse width modulated (PWM) active current source rectifier in which AC input power is selectively switched to create a DC output bus voltage from which a load is driven by a PWM controlled inverter stage. Other examples include wind driven generators providing input AC to a power converter, which is then transformed to an intermediate DC with an output inverter providing AC power to a grid. A source-side filter is often provided in the AC input lines for differential filtering, and certain systems employ common mode chokes or other techniques are used for suppression of common mode voltages. However, conventional filters are often bulky and expensive, whereby a need exists for improved common mode blocking and differential filtering in motor drives and other power converters.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides power converters with integrated common mode and differential mode chokes for concurrent differential filtering and common-mode voltage blocking in power conversion applications.

A power conversion system is provided in accordance with one or more aspects of the disclosure, which includes a filter circuit coupleable with an AC source having an integrated choke assembly. The choke core has an outer structure including three or more outer portions spaced from the core structure center, with windings provided on the outer portions to form individual inductances of the filter circuit. A corresponding number of branch portions extend inward from the outer core structure toward the center, with the branch portions being wider than the outer portions. In certain embodiments, the ratio of the branch width to the outer portion width is around 1.5. The system also includes a source-side converter with AC nodes coupled to the filter output. The source-side converter has switching devices individually coupled between corresponding AC nodes and one of first and second DC nodes, and an intermediate DC circuit is coupled with the converter DC nodes. In certain embodiments, the branch portions of the core structure do not touch one another so as to provide air gaps therebetween near the core center. In certain embodiments, moreover, the outer core structure is circular with outer portions radially spaced from the center, where the branch portions extend radially inward from the corresponding outer portion toward the center. In other embodiments, the outer structure is triangular with substantially straight outer portions and with the branch portions extending from a midpoint of the corresponding outer portion toward the center. In certain embodiments, the integrated choke provides common-mode inductors having a total common mode inductance value and differential mode inductances having a differential mode inductance value, where the ratio of the common mode and differential mode inductance values is very large, such as 40 or over 50 in certain embodiments. The core structure in certain embodiments includes a plurality of laminations, each being a single piece having an outer structure with an integer number of outer portions and a corresponding integer number branch portions.

In accordance with further aspects of the disclosure, an integrated choke assembly is provided, which includes an outer structure with three or more outer portions spaced from the core structure center and windings on the outer portions to form individual inductances. Branch portions extend toward the center from corresponding outer portions, where the branch portions are wider than the outer portions, such as about 50% wider in certain embodiments. Certain embodiments include air gaps between the branch portions. In certain embodiments, the outer core structure is circular with outer portions radially spaced from the center, and triangular outer structures are provided in other embodiments with substantially straight outer portions. The core structure includes a plurality of laminations in certain embodiments, with each lamination being a single piece having an outer structure with an integer number of outer portions and a corresponding integer number branch portions. The choke in certain embodiments provides common-mode inductors and differential mode inductances with a ratio of the common mode and differential mode inductance values very large, such as 40 or over 50 in certain embodiments.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1A:
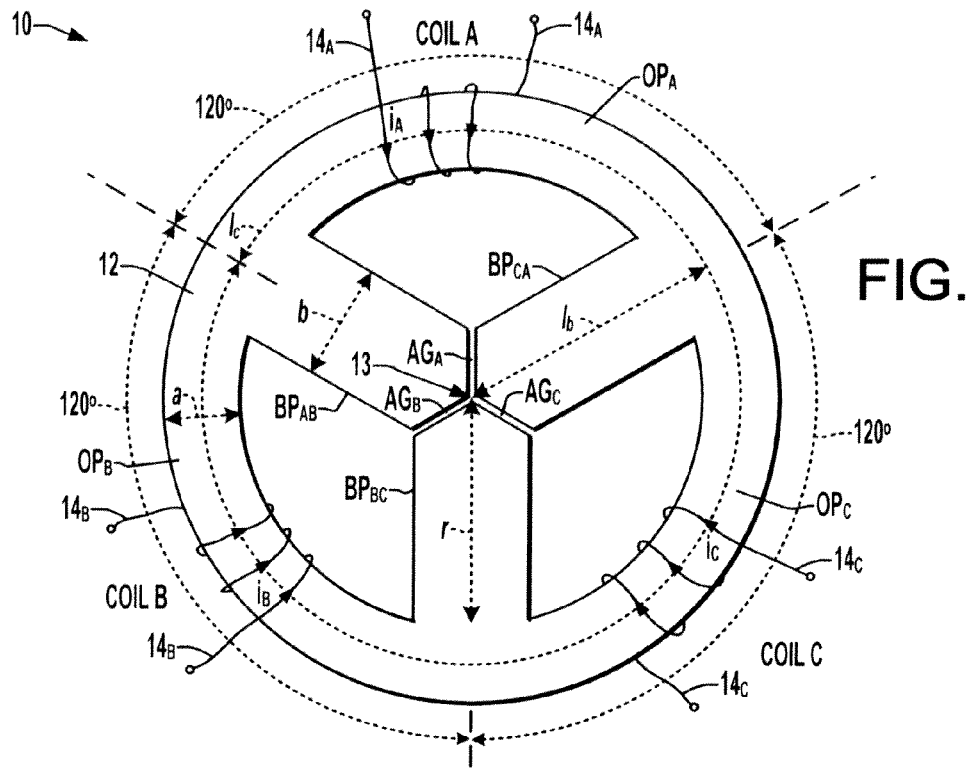
FIG. 1A is top plan view illustrating an exemplary circular integrated choke assembly with three outer core portions and schematically illustrated windings forming input filter inductors for a power conversion system, and with three inner branch leg portions extending from the outer core structure toward a choke center in accordance with one or more aspects of the present disclosure.

Several embodiments or implementations are hereinafter described in conjunction with the drawings, wherein like reference numerals are used to refer to like elements throughout, and wherein the various features are not necessarily drawn to scale. Power converters are disclosed along with integrated chokes for AC filter circuits in which the choke core has narrow outer portions and wide inner branch leg portions for providing both differential filtering and common-mode voltage blocking, which find utility in any form of power converter including motor drives and other power conversion applications.

Referring initially to FIGS. 1A-1E, an exemplary integrated choke assembly 10 is illustrated, having a circular shape. An exemplary triangular embodiment 50 is illustrated and described below in connection with FIGS. 2A-2D. The circular assembly 10 in FIGS. 1A-1E includes a magnetic core structure 12 with a circular outer structure having three outer portions $OP_A$, $OP_B$, and $OP_C$ spaced radially from a structural center 13. The outer portions OP are generally symmetrical, with each extending circumferentially around the center 13 through an angle of 120 degrees to provide an outer effective magnetic path length $l_c$ of about 33.35 cm in one example, and having an outer portion width dimension "a" of about 1.6 cm. Three windings $14_A$, $14_B$, and $14_C$ are wound around the corresponding outer portions $OP_A$, $OP_B$, and $OP_C$, respectively, and these windings 14 each form an inductance of a filter circuit in the power conversion system embodiments illustrated and described below in connection with FIGS. 3-10. In particular, the circumferential outer magnetic path (length $l_c$ in FIG. 1A) and the windings $14_A$-$14_C$ provide series inductances that can be connected to an input or output three-phase AC connection. Thus connected, the outer magnetic path and the windings 14 thereon provide for common mode inductances for common mode voltage suppression in operation of a power converter in which the choke assembly 10 is connected.

The choke assembly 10 also provides for differential mode filtering by including three branch portions $BP_{AB}$, $BP_{BC}$, and $BP_{CA}$ individually extending inward from the outer core structure between adjacent outer portions OP toward the center 13. For example, a branch portion $BP_{CA}$ extends from the joinder of outer portions $OP_A$ and $OP_C$ inwardly toward the center 13. Each branch portion BP has a width "b" (FIG. 1), such as about 2.45 cm in one example, where the branch portion width dimension "b" is greater than the outer portion width dimension "a". The ratio b/a in certain embodiments is generally smaller than √3, and the higher the switching frequency, the larger the ratio value of b/a (the closer to √3), such as about 1.53 in one example. In the illustrated embodiment of FIGS. 1A-1E, moreover, air gaps AG are provided, with the branch portions $BP_{AB}$, $BP_{BC}$, and $BP_{CA}$ individually extending inward toward the center 13 without touching one another to define air gaps $AG_A$, $AG_B$, and $AG_C$ therebetween.

The branch portions and their structural and electromagnetic relation to the outer portions OP and the windings 14 thereon provide magnetic flux branch paths for differential mode inductances. In certain embodiments of the circular choke assembly 10, this provides a total common mode inductance value $L_{cm}$ for paralleled three phases in a power converter filter circuit, as well as three differential mode inductances having a differential mode inductance value $L_{diff}$, where a ratio $L_{cm}/L_{diff}$ of the common mode inductance value $L_{cm}$ to the differential mode inductance value $L_{diff}$ for the choke assembly 10 is very large, preferably above 50. In one exemplary embodiment, a common mode inductance $L_{diff}$ of 126.5 mH is achieved along with a differential inductance value $L_{diff}$ of 2.3 mH (0.1 p.u.), for an inductance ratio $L_{cm}/L_{diff}$ of about 54.96, which is particularly useful for concurrent differential filtering and common mode voltage blocking in a power conversion system. Other embodiments are possible for any integer number N outer portions OP and inner branch leg portions BP where N is three or more. In addition, while the illustrated choke assembly 10 has an equal number of outer portions OP and inner branch leg portions BP, this is not a strict requirement of the disclosure.

Figure 10:
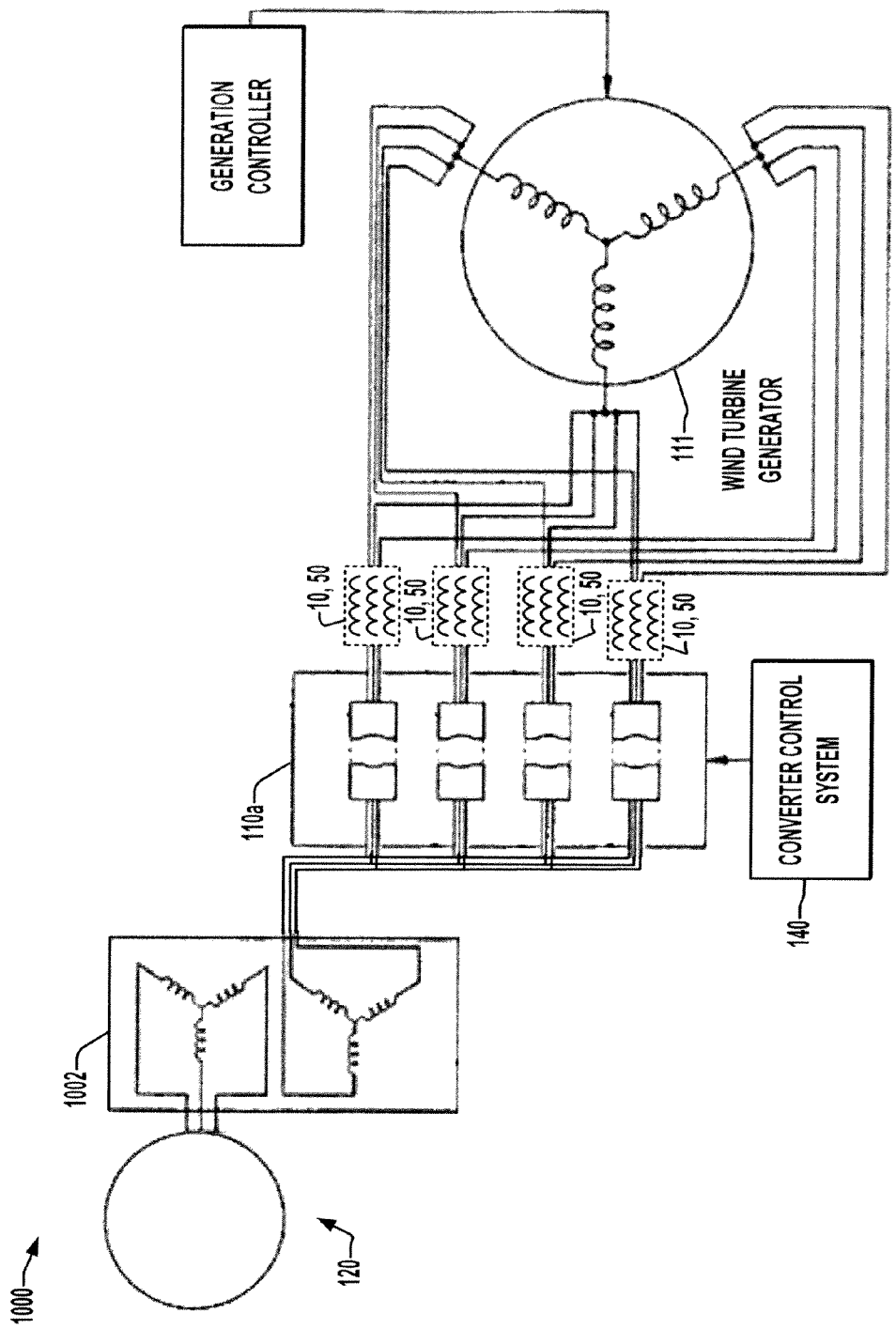
FIG. 10 is a schematic diagram illustrating an exemplary parallel wind turbine-type power conversion systems with input filters circuits having integrated choke assemblies.

As best seen in FIG. 10, the circular embodiment 10 includes a core structure 12 having an overall thickness W and is fabricated using a plurality of laminations $12_1 \ldots 12_M$, with each lamination $12_i$ being a single piece including an outer structure with three outer portions OP having an outer portion width dimension a and three branch portions BP having a branch portion width dimension b. This facilitates economic manufacture in the fabrication of the laminations $12_i$ as well as in assembly of the laminations $12_1 \ldots 12_M$, where each lamination may in certain embodiments include one or more notches or other physical features or attributes to facilitate alignment thereof in forming the core structure 12.

Figure 1B:
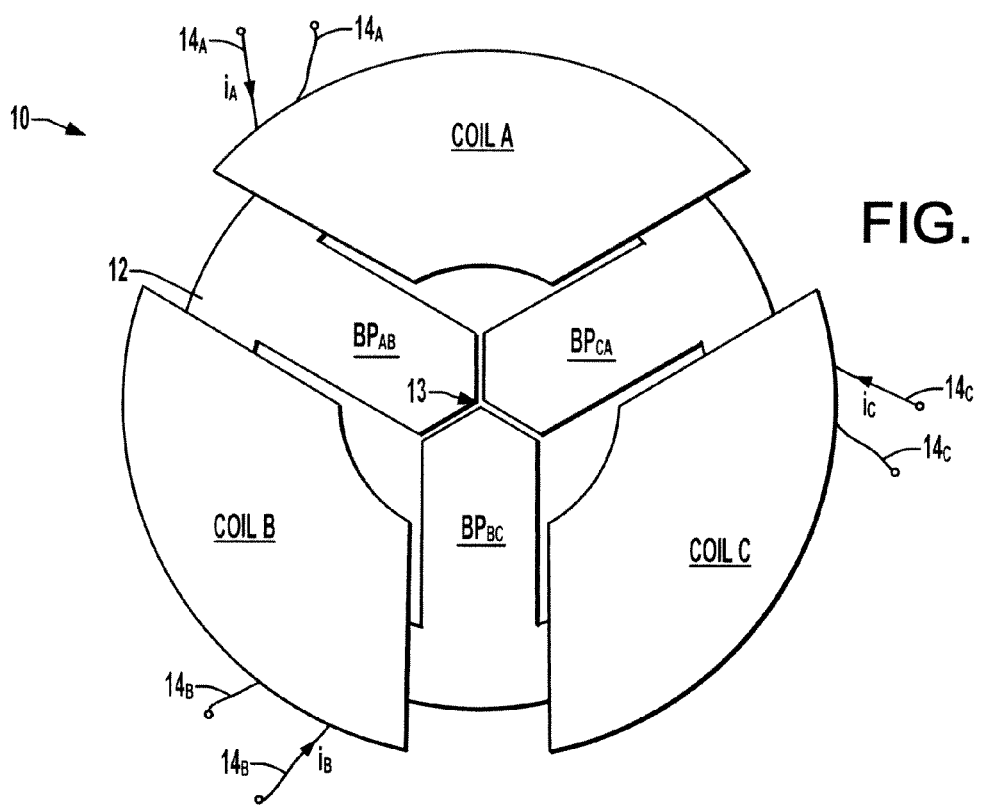
FIG. 1B is a top plan showing wound coils encircling circular outer portions of the integrated choke assembly of FIG. 1A.
Figure 1C:
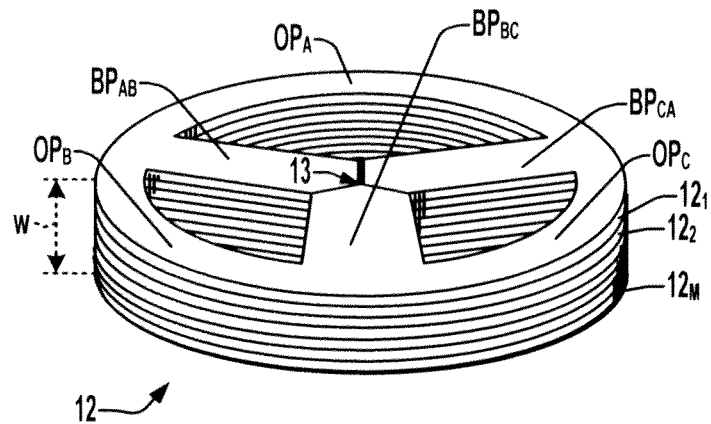
FIG. 1C is a top perspective view illustrating the circular core structure of FIGS. 1A and 1B constructed as a series of single whole-piece stacked laminations.

As seen in FIGS. 1A and 1C, the dimension a is the width of the outer peripheral core portions OP, b is the width of the bridge leg portions BP, r is the radius of the inscribed circle of the circular shape and W is the core structure thickness. The following Table lists these dimensions and other parameters for an exemplary circular integrated choke assembly 10.

TABLE I

Geometric parameters of the Circular Choke Assembly.

| Shape | a (cm) | b (cm) | w (cm) * | r (cm) | $l_a$ (cm) | $l_c$ (cm) | $l_b$ (cm) | $A_c$ (cm$^2$) | $W_a$ (cm$^2$) | WF | N (turns) | MLT (cm) |
|---|---|---|---|---|---|---|---|---|---|---|---|---|
| Circular | 1.6037 | 2.4465 | 4.2375 | 4.5061 | N/A | 33.3507 | 5.3079 | 6.6597 | 11.1028 | 0.4 | 96 | 18.7613 |

In this table, $l_c$ and $l_b$ are the mean circumference of the periphery and bridge leg lengths, respectively, representing the magnetic path length. $A_c$ is the effective cross-sectional area of the external core (that of the bridge portions BP is correspondingly proportional) and $W_a$ is the window area for one phase. WF is the window filling factor, and N and MLT are parameters of the winding: number of turns and mean length per turn, respectively.

Figure 1D:
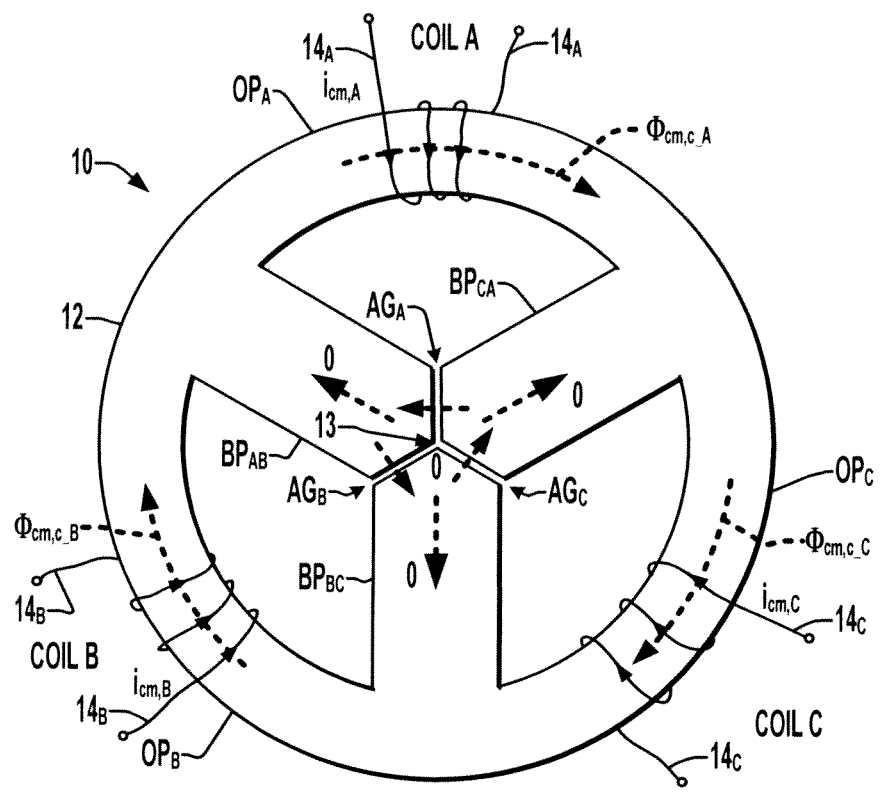
FIG. 1D is a top plan view illustrating the circular core structure of FIGS. 1A-1C showing common mode flux paths.
Figure 1E:
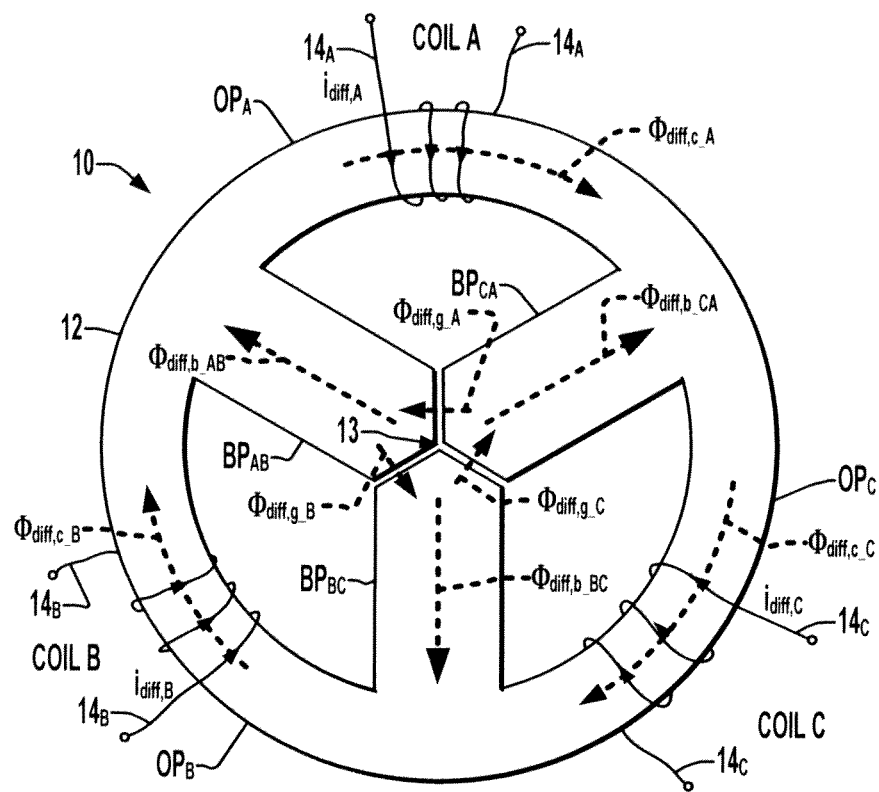
FIG. 1E is a top plan view illustrating the circular core structure of FIGS. 1A-1D showing differential mode flux paths.

FIGS. 1D and 1E illustrate common mode flux paths and differential mode flux paths, respectively, in the circular core structure 10 of FIGS. 1A-1C. The common mode flux paths $\phi_{cm}$ and corresponding inductances in FIG. 1D are described by the following equations:

$$i_{cm,A} = i_{cm,B} = i_{cm,C} = i_{cm}/3$$

$$\Phi_{cm} = \frac{N i_{cm}}{3\Re_c} = \frac{N i_{cm}}{l_c} \cdot \mu_0 \mu_r \cdot A_c$$

$$L_{cm} = \frac{N^2}{3\Re_c} = \frac{N^2}{l_c} \mu_0 \mu_r \cdot A_c$$

The differential mode flux paths $\phi_{diff}$ and inductances in FIG. 1E are described by the following equations:

$$\Phi_{diff,c\_A} = \frac{N i_{diff,A}}{(\Re_c + 3\Re_b + \Re_g)} \approx \frac{N \cdot I_{ac,peak} \cdot \sin(\omega t)}{\Re_g}$$

$$\Phi_{diff,b\_AB} = \frac{N(i_A - i_B)}{(\Re_c + 3\Re_b + \Re_g)} \approx \frac{N \cdot \sqrt{3} I_{ac,peak} \cdot \sin(\omega t + 30°)}{\Re_g}$$

$$L_d = \frac{N \Phi_{diff,circle}}{i_{diff}} = \frac{N^2}{(\Re_c + 3\Re_b + \Re_g)} \approx \frac{N^2}{\Re_g} = \frac{N^2}{l_g} \mu_0 \cdot (A_b/\sqrt{3})$$

The following Table II provides various electrical simulated specifications for the illustrated circular integrated choke 10 shown in FIGS. 1A-1E.

Figure 2A:
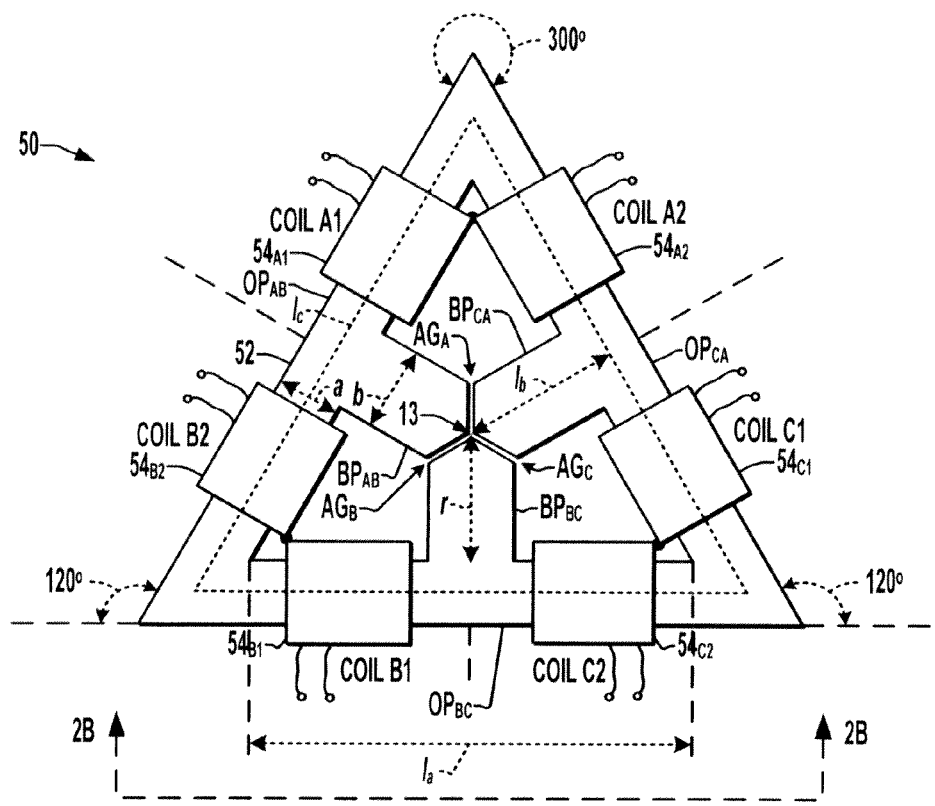
FIG. 2A is top plan view illustrating another exemplary integrated choke assembly having a triangular core structure with three straight outer core portions and three inner branch leg portions extending from midpoints of the outer core portions toward the choke center in accordance with the present disclosure.
Figure 2B:
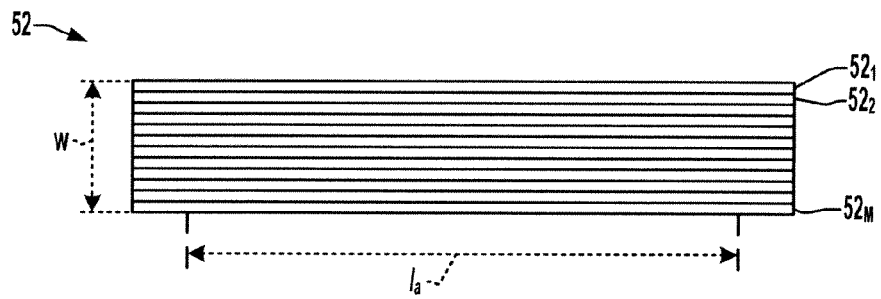
FIG. 2B is a side elevation view illustrating the core structure of FIG. 2B constructed as a series of single whole-piece stacked laminations.

Referring also to FIGS. 2A-2D, furthermore, embodiments are possible in which one or more of the coil windings 14 are separated into more than a single winding. FIGS. 2A-2D show another exemplary integrated choke assembly 50 with a triangular core structure 52 having three substantially straight outer core portions OP and three inner branch leg portions BP extending from midpoints of the outer core portions OP toward a choke center 13 in accordance with the present disclosure. Each phase coil is split into two windings 54, including windings $54_{A1}$, $54_{A2}$, $54_{B1}$, $54_{B2}$, $54_{C1}$, and $54_{C2}$ as seen in FIG. 2A. The triangular choke assembly 50 is further characterizes as including an inner side length La as shown in the following Table III.

TABLE III

Geometric parameters of the Triangular Choke Assembly.

| Shape | a (cm) | b (cm) | w (cm) * | r (cm) | $l_a$ (cm) | $l_c$ (cm) | $l_b$ (cm) | $A_c$ (cm$^2$) | $W_a$ (cm$^2$) | WF | N (turns) | MLT (cm) |
|---|---|---|---|---|---|---|---|---|---|---|---|---|
| Triangular | 1.5650 | 2.3876 | 3.8598 | 4.4869 | 15.543 | 54.7617 | 5.2694 | 5.9199 | 24.9802 | 0.20 | 54 (108) | 18.4450 |

Because the windings in the triangular choke 50 are split into two, the example described in the above table includes 54 turns for each half-coil, where each of the coils COIL A, COIL B, and COIL C includes a total of 108 turns. The triangular integrated choke assembly 50 provides three common-mode inductors having a total common mode inductance value $L_{cm}$ and three differential mode inductances with a differential mode inductance value $L_{diff}$, where the ratio $L_{cm}/L_{diff}$ of one embodiment of the integrated choke assembly 50 is greater than 35.

The following Table IV shows various comparative parameters for exemplary circular and triangular integrated choke assemblies 10 and 50, respectively.

TABLE II

| Power rating (S, kW) | Rated voltage (line-to-line rms $V_{LL}$, V) | Rated current at unity power factor ($I_{ac}$, A) | Minimum dc voltage from PV, or rectifier ($V_{dc}$, V) | Differential inductance (mH) $L_d = 0.1$ p.u. | SPWM switching frequency ($f_{sw}$, Hz) | Peak value of CMV ($V_{cm,peak}$, V) | Maximum CM current allowed ($i_{cm,max}$, A) | Minimum CM inductance ($L_{cm}$, mH) | Maximum total rms current in each phase ($I_{rms,max}$, A) |
|---|---|---|---|---|---|---|---|---|---|
| 5 | 208, 60 Hz | 13.8786 | 383.0406 | 2.295 | 5000 | 191.5203 | 0.05 | 121.96 | 13.8787 |

TABLE IV

| Shape | WF | $V_{circum}$ (cm³) | $V_{bridge}$ (cm³) | $W_{tfe}$ (grams) | $W_{tcu}$ (grams) | $W_{tc}$ (grams) | $L_{cm}/L_{diff}$ |
|---|---|---|---|---|---|---|---|
| Circular | 0.4 | 226.6369 | 129.1653 | 2714.8 | 2222.2 | 4936.9 | 54.9635 |
| Triangular | 0.20 | 330.8026 | 114.5236 | 3397.8 | 2457.7 | 5855.5 | 39.5683 |

Figure 2C:
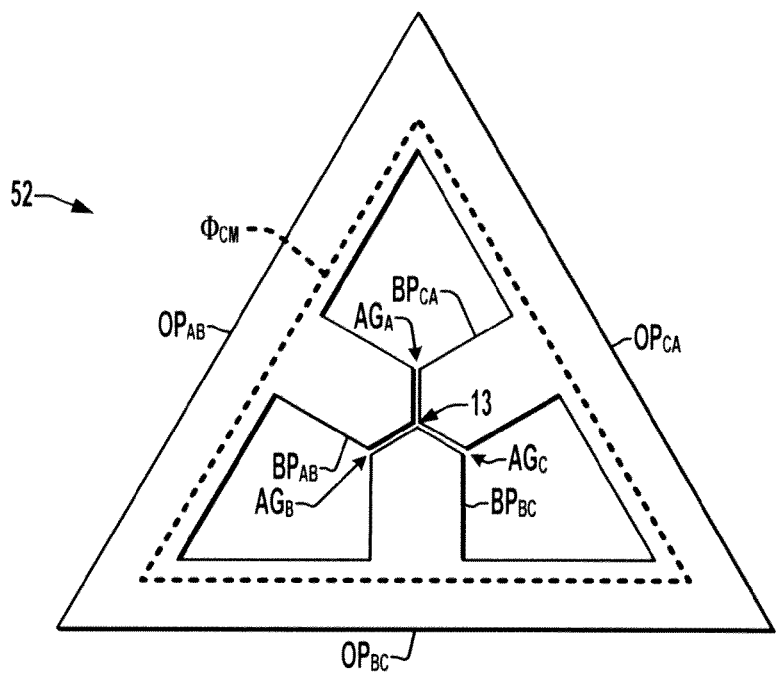
FIG. 2C is a top plan view illustrating the triangular core structure of FIGS. 2A and 2B showing common mode flux paths.
Figure 2D:
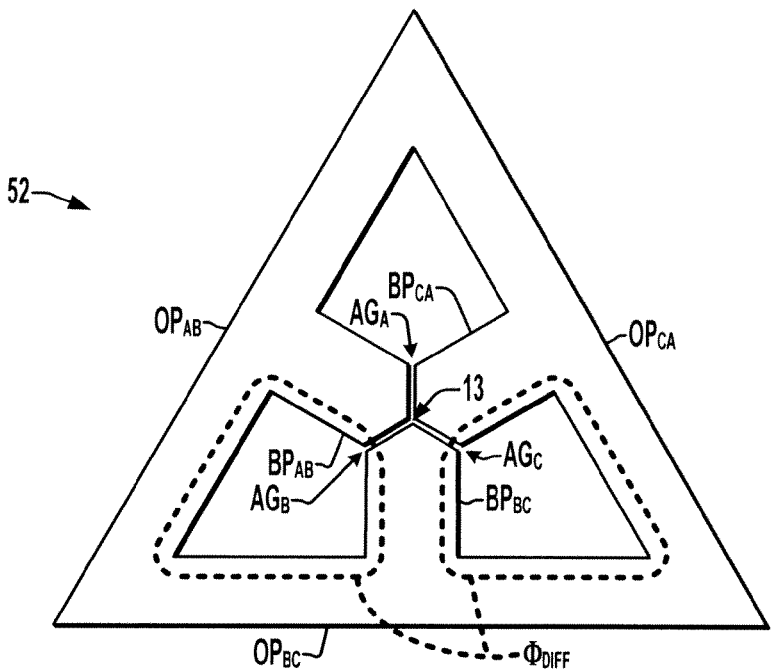
FIG. 2D is a top plan view illustrating the triangular core structure of FIGS. 2A-2C showing differential mode flux paths.

As seen above, the Window Factor of the circular assembly 10 is higher than that of the triangular design 50, thus saving the core material and reducing cost and weight, whereas the triangular design 50 has a slightly higher number of turns and is more applicable to high power applications due to the ability to better utilize cabinet space. The circular core design 10 and the triangular approach 50 are each applicable to high, low, and medium power applications, and the use of single whole-piece laminations for both designs facilitates low manufacturing costs. The circular design 10 has the minimum circumference for a given identical area value, and provides the shortest common-mode flux path length, leading to the minimum reluctance and thus the largest common-mode inductance. The circular choke 10 also has the best performance in common-mode voltage/current suppression, and provides the smaller size and weight. The differential-mode inductance $L_{diff}$ for both designs 10, 50 can be determined by the design of the air gaps AG. FIGS. 2C and 2D show exemplary common mode and differential mode flux paths, respectively, in the triangular integrated choke 50.

Referring also to FIGS. 3-10, the integrated choke assemblies 10, 50 may be included as part of a power conversion system 110 to advantageously facilitate suppression or blocking of common mode voltages and currents and to provide differential filtering. These chokes 10, 50 may be used in conjunction with architectural provision of common mode paths in power converters to eliminate or mitigate common mode voltages. For instance, regenerative drives may provide a connection of input and output filter neutral nodes and/or of the source and load, where an intermediate dc link could be left floating or grounded. Transformerless photovoltaic (PV) inverters may include connections between a ground and a DC midpoint and neutral of a grid-connected filter. The integrated chokes 10, 50, moreover, may be used in paralleled power converters, where common mode loops intrinsically exist. In certain designs, the integrated choke 10, 50 is designed to provide a certain differential mode inductance $L_{diff}$ and high common mode impedance in order to block the zero-sequence current whose tolerance value determines the minimum common mode inductance $L_{cm}$. Use of the integrated chokes 10, 50 beneficially facilitate elimination of transformers (e.g., in photovoltaic inverter systems), to merge common mode suppression functions to input or output multi-phase AC filter circuits, to reduce the cost in materials and/or manufacture compared to conventional E-I designs or separate choke implementations (e.g., half total weight reduction and 30% copper loss decrease compared to conventional separate chokes), and also to facilitate reduction or minimization of size/weight, particularly for the circular design 10 and ease of manufacture provided by the triangular approach 50.

Several exemplary power conversion systems 110 are illustrated and described below in which common mode current paths of particular interest are indicated, and in which the above described integrated choke designs 10, 50 can be provided in one or more of input filter circuits 112 and/or output filter circuits 113 in accordance with various aspects of the disclosure.

Figure 3:
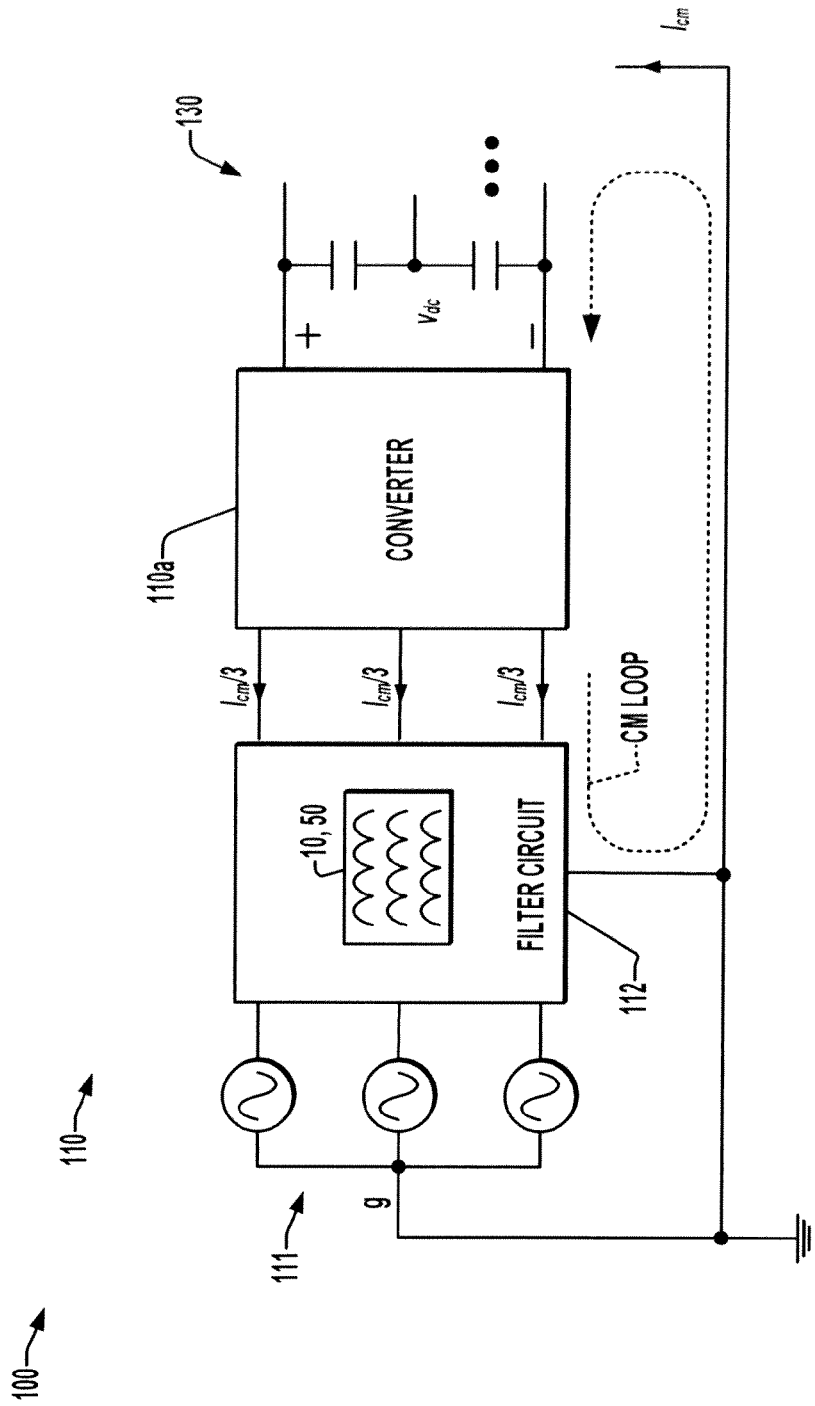
FIG. 3 is a schematic diagram illustrating an exemplary power conversion system with an input filter including an integrated choke between a grid or source and a source-side rectifier converter stage in accordance with the disclosure.

FIG. 3 illustrates one such power conversion system 110, that includes a filter circuit 112 with three AC input nodes coupled to a multi-phase AC electrical power source 111 for receiving AC electrical power. The filter circuit 112 can be of any suitable filter circuit construction, such as a multi-phase LC, LCL, or other filter configuration. The filter circuit 112 includes one or more integrated choke assemblies 10, 50 as described above, each providing three filter inductances (L) of the filter circuit 112. A source-side converter 110a is provided, such as a rectifier, including a plurality of converter AC nodes coupled with the multi-phase output of the filter 112.

The converter 110a provides a DC output via first and second DC nodes to an intermediate DC circuit 130 using switching devices (not shown in the example of FIG. 3) to selectively couple the converter AC nodes and the DC nodes. The intermediate DC circuit 130 in the system 100 of FIG. 3 may include one or more inductances (e.g., for current-source converters) or one or more capacitances as shown for voltage-source converter applications. Subsequent converter stages may be provided, for instance, an inverter stage to convert the intermediate DC from circuit 130 into output AC, such as for powering an electric motor load.

Figure 4:
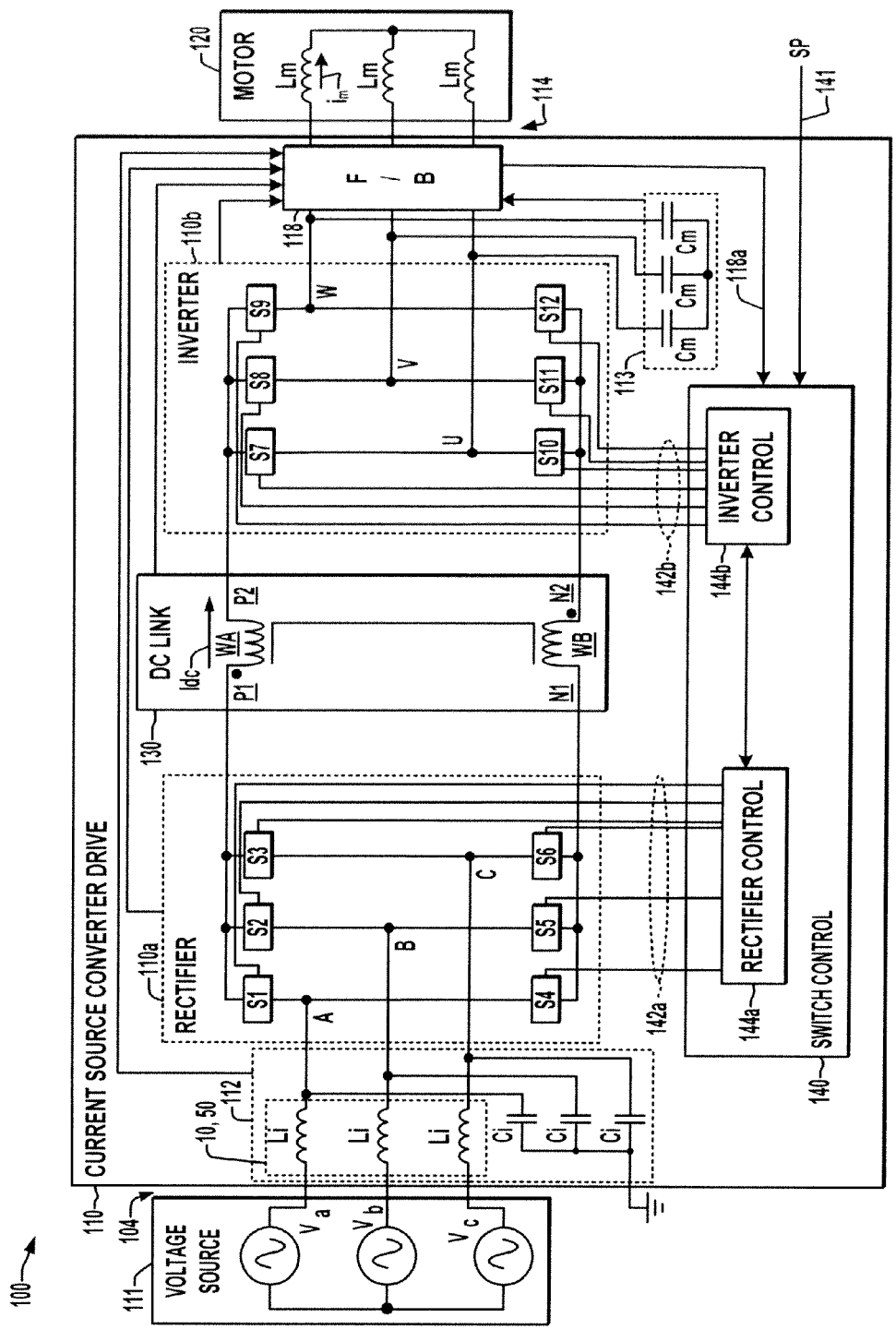
FIG. 4 is a schematic diagram illustrating an exemplary current source converter type variable frequency motor drive power converter with an input filter including an integrated choke in accordance with one or more aspects of the present disclosure.

FIG. 4 illustrates another exemplary system 100 including a current source converter (CSC) type motor drive power conversion system 110 driving a motor load 120, with a source-side (input) filter 112 including an integrated choke 10, 50 in accordance with one or more aspects of the disclosure. While illustrated in connection with a current source type converter 110 with an LF input filter 112 and a C output filter 113, other embodiments are possible using a voltage source type converter 110 with a LC or LCL input filter 112 and with or without an LC output filter 113. In certain embodiments, the conversion system 100 includes a current source rectifier and an intermediate circuit having one or more inductances. In certain embodiments, the power conversion 100 system is a distributed power generation system in which the rectifier is a grid-tie current source converter and the intermediate circuit includes at least one inductance, or the rectifier may be a 2-level or multilevel grid-tie voltage source converter and the intermediate circuit includes at least one capacitance.

The drive 110 includes a rectifier 110a with an AC input circuit 104 including a rectifier input filter 112 coupled with a three-phase AC voltage source 111 providing input power to the drive 110, and the drive 110 converts the input power to provide motor current $i_m$ to drive a motor load 120 having phase windings with associated inductances Lm coupled to a converter output 114. The drive 110 is a current source converter (CSC) type, with a filter circuit 112 connected to the AC power source 111. While these examples are illustrated as having a three phase input 104, other embodiments may provide a single phase AC input or may include a multiphase input adapted to receive three or more input phases. The CSC drive 110 in FIG. 4 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases, and may power a load other than a motor, such as a power grid in a wind energy system, for example. The illustrated motor drive 110 includes both input filter capacitors Ci in the input filter 112, as well as output filter capacitors Cm in an output filter circuit 113. The input filter capacitors Ci are coupled between corresponding input phase lines A, B, and C and an input neutral node. The output capacitors Cm are individually coupled between a corresponding output phase line U, V, and W and an output neutral node. Certain embodiments may omit either or both of the input or output filter capacitor sets. The input and output neutral nodes may be floating in certain embodiments, or one or both of the neutrals may be coupled to the ground of the input power source or to another ground. In still other possible embodiments, the neutrals may be coupled to one another directly or through an impedance without reference to any system ground. In the illustrated example, the node is grounded.

The drive 110 includes a rectifier 110a receiving the AC input power from the source 111 via an input 112, as well as an intermediate DC circuit 130 with a DC link inductance (link choke) having upper and lower windings WA and WB coupled between the rectifier 110a and an output inverter 110b. In certain embodiments, the DC link could be a simple DC link inductor or a common mode choke with windings in each of the upper and lower DC current paths as in the illustrated example. In other embodiments, a single link inductor could be provided in only one of the upper and lower DC current paths. In still other embodiments, the drive 110 could be a voltage source converter drive with an intermediate DC bus voltage established in the circuit 130, with a capacitance (single or multiple capacitors) connected between the upper and lower DC branches. The illustrated drive 110 provides input filtering including inductors Li in each input phase and input filter capacitors Ci coupled between the input lines A, B, C, and the input neutral node. The rectifier 110a is a current source rectifier (CSR) coupled with a current source inverter (CSI) 110b by the intermediate DC circuit 130, and one or more isolation components (e.g., transformers, not shown) may optionally be included in the drive 110. The output 114 provides AC electrical output power to the motor load 120 via lines U, V, and W, and includes filter circuit 113 with the output capacitors Cm coupled between the load 120 and the output neutral node.

The rectifier 110a is an active switching-type current source rectifier (CSR) with switching devices S1-S6 coupled between the input 112 and the DC circuit 130 and operates according to a plurality of rectifier switching control signals 142a provided by a rectifier control component 144a of a switch control system 140. In operation, the AC input power is switched by the rectififer switches S1-S6 to create an intermediate DC link current Idc in the intermediate circuit 130. The exemplary inverter 110b is a current source inverter (CSI) that includes switching devices S7-S12 coupled between the DC circuit 130 and phase lines U, V, and W of the output 114. The inverter switches S7-S12 are operated according to corresponding switching control signals 142b from an inverter control component 144b of the switch control system 140 to selectively convert DC power from the DC circuit 130 to provide the AC output power to drive the motor load 120.

In the intermediate DC (link) circuit 130, the DC link choke or inductor links the switches of the rectifier 110a and the inverter 110b, and provides forward and return current paths therebetween. The first winding WA of the link choke is coupled in a forward or positive DC path and has a first end P1 connected to the upper rectifier switches S1-S3 and a second end P2 coupled with the upper inverter switches S7-S9. The second (lower) winding WB is coupled in a negative or return DC path and has a first end N1 coupled to the lower rectifier switches S4-S6 as well as a second end N2 coupled to the lower inverter switches S10-S12.

The rectifier and inverter switching devices S1-S12 may be any suitable controllable electrical switch types (e.g., SGCTs, IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could be used for the inverter switching devices S7-S12 in the form of forced commutated devices with extra circuitry added to the device triggering circuit thereof.

The rectifier 110a and the inverter 110b operate under control of the switch control system 140, which may include one or more processors and associated memory as well as I/O circuits including driver circuitry for generating switching control signals 142 to selectively actuate the switching devices S1-S12 although separate switching control systems may be employed, for example, with interconnections and information sharing to facilitate the coordinated operation of the rectifier 110a and the inverter 110b. The switch control system 140 in these embodiments includes an inverter control component 144b providing the inverter switching control signals 142b to cause the inverter 110b to selectively convert DC current from the intermediate DC circuit 130 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof, operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144a of the controller 140 provides the rectifier switching control signals 142a to cause the rectifier 110a to convert AC electrical input power to provide a regulated DC current Idc to the DC circuit 130. In doing so, the rectifier controller 144a may employ one or more feedback signals or values 118a, such as a measured DC current value from the rectifier 110a representing the actual DC link current Idc and/or DC link voltage. The DC link current Idc from the rectifier 110a provides input current for conversion by the inverter 110b, where the exemplary inverter control 144b may provide a desired DC link current signal or value as a regulation setpoint to the rectifier controller 144a. In this manner, the rectifier 110a provides the DC current required by the inverter 110b, and the rectifier controller 144a may also implement other control functions such as power factor correction, while the inverter controller 144b performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 130, the inverter 110b, the output filter 113, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, currents, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 130, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

Figure 5:
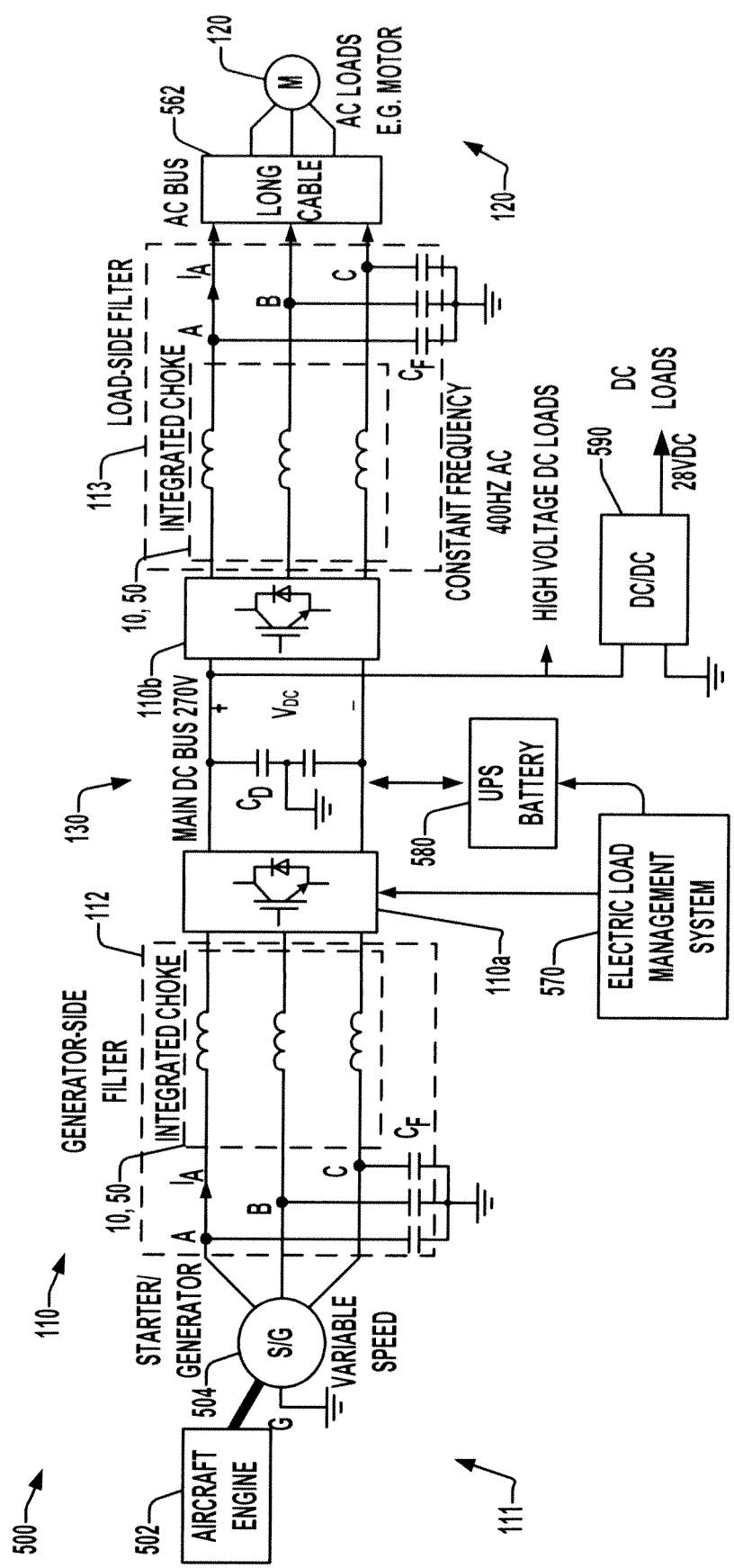
FIG. 5 is a schematic diagram illustrating an exemplary voltage source type aerospace motor drive power converter receiving 3-phase input AC power from a variable speed starter/generator, with integrated choke assemblies disposed within input and output filter circuits.

FIG. 5 illustrates a system 500 with an exemplary voltage source type aerospace motor drive power converter 110 receiving 3-phase input AC power from a variable speed starter/generator 504 driven by an aircraft engine 512, with integrated choke assemblies 10, 50 disposed within one or more of the input and output filter circuits 112 and/or 113. In such aerospace industry applications, space utilization is important and saving in size and weight of the integrated choke designs 10, 50 facilitates these special requirements. The illustrated system 110 includes an include filter 112 with filter capacitors $C_F$ and series inductors formed as an integrated choke 10, 50 to transfer power from the generator 504 to a switching rectifier 110a controlled by an electric load management system 570. The rectifier 110a provides regulated DC voltage to an intermediate DC link circuit 130 having capacitance(s) $C_D$, and which may optionally provide DC power to a battery in an uninterruptable power supply (UPS) circuit 580 and to a DC/DC converter 590. An output inverter 110b drives a motor load 120 through a possible long cable 562, and an L-C type multiphase output filter 113 is provided including inductors formed via an integrated choke 10, 50 and output filter capacitors $C_F$ disposed between the inverter output and the motor cable 562.

Figure 6:
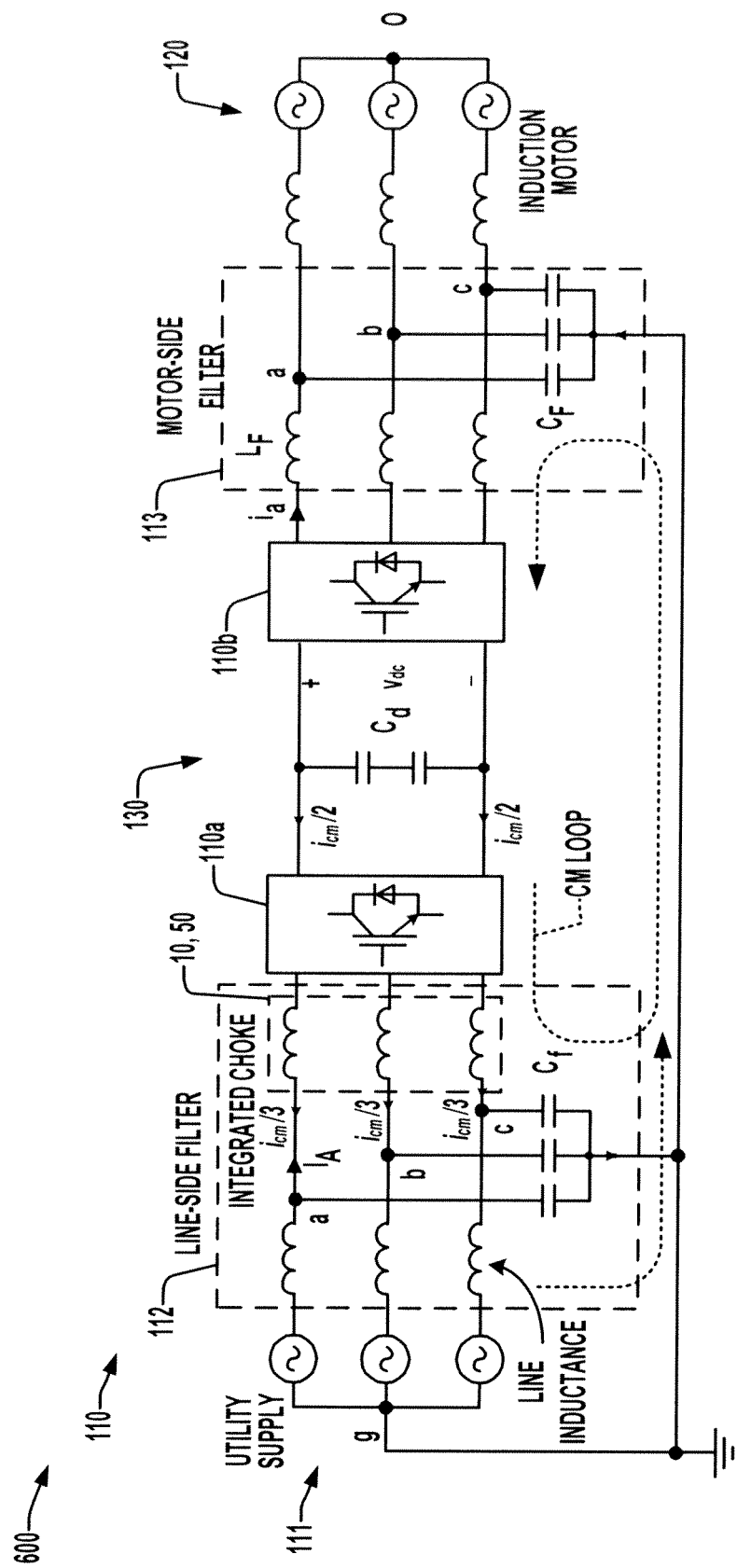
FIG. 6 is a schematic diagram illustrating an exemplary voltage source type locomotive regenerative motor drive power conversion system having an integrated choke assembly in an input filter circuit.

FIG. 6 illustrates a system 600 with an exemplary voltage source type locomotive regenerative motor drive power conversion system 110 having an integrated choke assembly 10, 50 providing line inductances in an input filter circuit 112. A three-phase utility supply 111 is connected to the input filter 112 and a switching rectifier stage 110a converts the input AC to charge one or more capacitances $C_d$ of an intermediate DC link circuit 130. An inverter 110b converts the DC link power into output AC currents to drive a motor load 120. The system 110 in this embodiment also includes an output filter 113 with filter inductances $L_F$ and filter capacitors $C_F$, where the output inductances $L_F$ in certain embodiments may be implemented as a multi-phase integrated choke 10, 50 as described above. The use of one or more of the above-described integrated chokes 10, 50 may facilitate reduction in power converter cost and size and improved power conversion efficiency.

Figure 7:
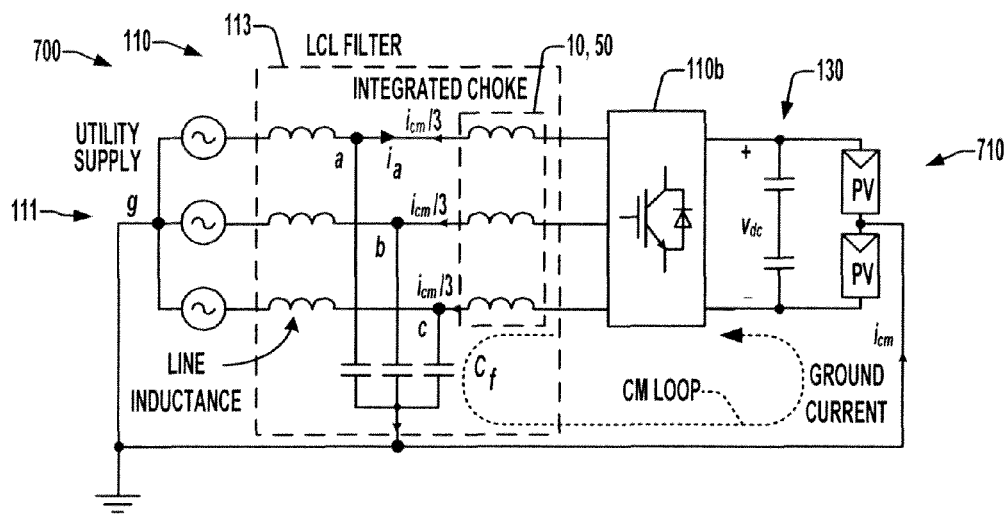
FIG. 7 is a schematic diagram illustrating an exemplary transformerless photovoltaic inverter power conversion system including an integrated choke assembly in a filter circuit.
Figure 8:
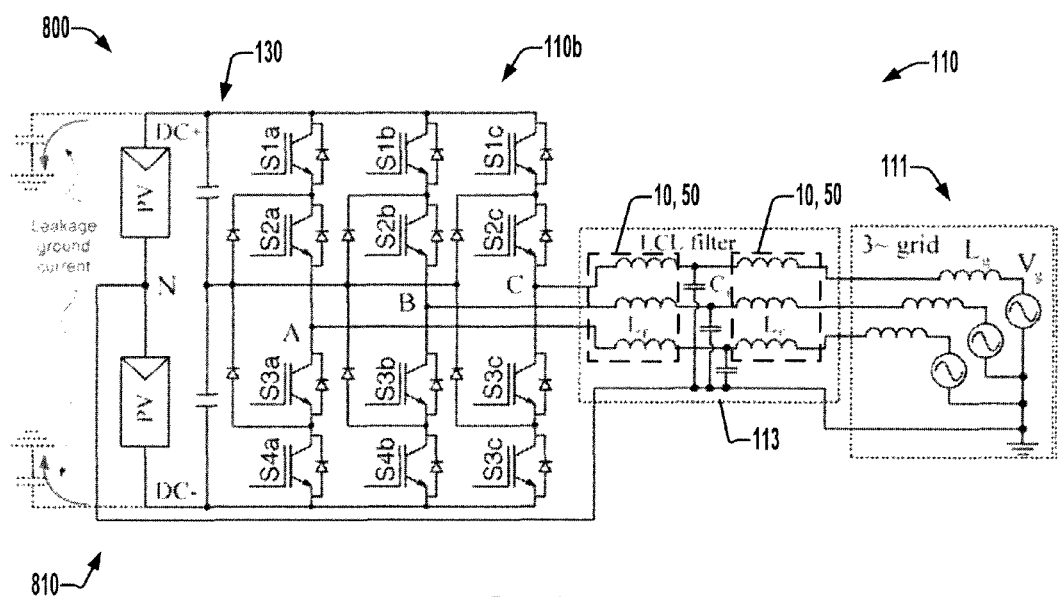
FIG. 8 is a schematic diagram illustrating another exemplary transformerless photovoltaic inverter power conversion system including an integrated choke assembly in a filter circuit.

FIGS. 7 and 8 illustrate power conversion systems 110 used in renewable energy generation system 700 and 800, respectively, such as those described in T. K. Kerekes, R. Teodorescu, M. Liserre, C. Klumpner and M. Sumner, "Evaluation of three-phase transformerless photovoltaic inverter topologies", IEEE Trans. Power Electron., vol. 24, No. 9, pp. 2202-2211, September 2009, the entirety of which is incorporated herein by reference. The transformerless photovoltaic inverter systems 700 and 800 are modified to include integrated common mode chokes 10, 50 to block leakage grounding current. FIG. 7 illustrates a system 700 with an exemplary transformerless photovoltaic inverter system 110 including an output filter 113 coupled with a utility grid supply 111. The filter 113 includes filter capacitors $C_f$ and an integrated choke assembly 10, 50 providing filter inductances between the grid 111 and an inverter 110b. One or more photovoltaic (PV) sources 710 provide DC power to charge capacitors of an intermediate DC circuit 130, thereby providing an input DC voltage $V_{dc}$ as an input to the inverter 110b, which in turn generates AC to supplement the grid power. FIG. 8 shows a transformerless photovoltaic inverter system 800 with PV sources 810 supplying a DC intermediate circuit 130, with an inverter 110b having switches S to convert the intermediate DC to drive a three-phase power grid 111. In this embodiment, an LCL filter circuit 113 is disposed between the inverter 110b and the grid 111, including two integrated chokes 10, 50 as described above.

Figure 9:
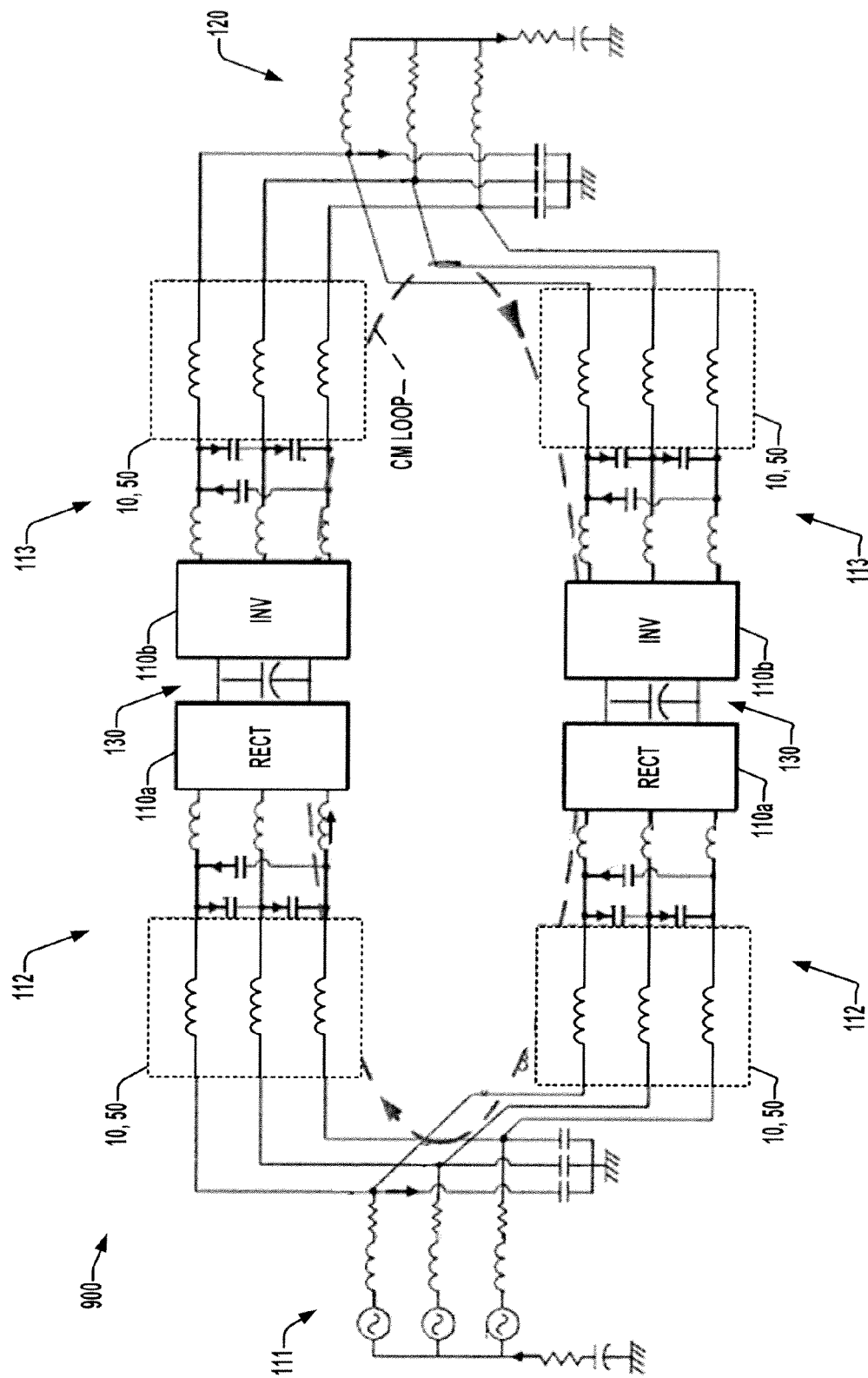
FIG. 9 is a schematic diagram illustrating an exemplary parallel power conversion system having integrated choke assemblies in input and output filter circuits.

FIGS. 9 and 10 illustrate parallel conversion system 900 and 1000 respectively, which employ integrated choke assemblies 10, 50 in input and/or output filter circuits 112, 113. These systems include a multiphase AC source 111, such as a wind turbine generator (FIG. 10) driving parallel converters 110a and/or 110b, with one or more line inductances being provided as integrated chokes 10, 50 of the type illustrated and described above between the turbine source 111 and the converter stage 110a, 110b. In these systems, a motor or other load 120 is driven by the converter output and transformers may be provided therebetween, or one or more integrated choke assemblies 10, 50 may be used (e.g., FIG. 9) between an output converter 110b and the load 120.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a filter circuit, comprising:
      a plurality of AC input nodes coupleable with a multiphase AC electrical power source for transfer of AC electrical power between the filter circuit and the power source,
      a multi-phase filter AC output, and
      an integrated choke assembly with:
         a magnetic core structure comprising:
            an outer structure with an integer number N outer portions spaced from a core structure center, N being greater than two, each outer portion having an outer portion width dimension, and
            an integer number N branch portions individually extending inward from the outer core structure toward the center, each branch portion having a branch portion width dimension greater than the outer portion width dimension, and
         a plurality of windings individually wound around a corresponding one of the outer portions, individual windings forming an inductance of the filter circuit;
   a source-side converter comprising a plurality of converter AC nodes coupled with the multi-phase filter output, a DC output with first and second DC nodes, and a plurality of converter switching devices individually coupled between one of the converter AC nodes and one of the first and second DC nodes, the converter switching devices individually operative to selectively couple the corresponding converter AC node with the corresponding DC node according to a corresponding converter switching control signal;
   an intermediate DC circuit comprising first and second DC current paths coupled with the first and second DC nodes of the converter; and
   a switch control system 140 operative to provide the converter switching control signals to the converter.

2. The power conversion system of claim 1, where the outer structure is circular with the outer portions being radially spaced from the core structure center, and where the branch portions individually extend inward from the outer core structure toward the center.

3. The power conversion system of claim 2, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 50.

4. The power conversion system of claim 1, where the outer structure is triangular with substantially straight outer portions spaced from the core structure center, and where the branch portions individually extend from a midpoint of the corresponding outer portion toward the center.

5. The power conversion system of claim 4, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 35.

6. The power conversion system of claim 1, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 35.

7. The power conversion system of claim 1, where a ratio of the branch portion width dimension to the outer portion width dimension is around 1.5.

8. An integrated choke assembly, comprising:
   a core structure comprising a plurality of laminations with each lamination being a single piece including:
      an outer structure with an integer number N outer portions spaced from a core structure center, N being greater than two, each outer portion having an outer portion width dimension, and
      an integer number N branch portions individually extending inward from the outer core structure toward the center, each branch portion having a branch portion width dimension; and
   a plurality of windings individually wound around a corresponding one of the outer portions, individual windings forming an inductance.

9. The integrated choke assembly of claim 8, where the branch portions individually extending toward the center without touching one another to define air gaps therebetween.

10. The integrated choke assembly of claim 8, where the outer structure is circular with the outer portions being radially spaced from the core structure center, and where the branch portions individually extend inward from the outer core structure toward the center.

11. The integrated choke assembly of claim 10, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 50.

12. An integrated choke assembly, comprising:
   a core structure comprising:
      an outer structure with an integer number N outer portions spaced from a core structure center, N being greater than two, each outer portion having an outer portion width dimension, and
      an integer number N branch portions individually extending inward from the outer core structure toward the center, each branch portion having a branch portion width dimension greater than the outer portion width dimension; and
   a plurality of windings individually wound around a corresponding one of the outer portions, individual windings forming an inductance;
   where the outer structure is triangular with substantially straight outer portions spaced from the core structure center, and where the branch portions individually extend from a midpoint of the corresponding outer portion toward the center.

13. The integrated choke assembly of claim 12, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 35.

14. The integrated choke assembly of claim 8, where a ratio of the branch portion width dimension to the outer portion width dimension is around 1.5.

15. The integrated choke assembly of claim 9, where the outer structure is circular with the outer portions being radially spaced from the core structure center, and where the branch portions individually extend inward from the outer core structure toward the center.

16. The integrated choke assembly of claim 15, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 40.

17. The integrated choke assembly of claim 15, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 50.

18. The integrated choke assembly of claim 15, where a ratio of the branch portion width dimension to the outer portion width dimension is around 1.5.

19. The integrated choke assembly of claim 9, where the outer structure is triangular with substantially straight outer portions spaced from the core structure center, and where the branch portions individually extend from a midpoint of the corresponding outer portion toward the center.

20. The integrated choke assembly of claim 19, where the integrated choke assembly provides an integer number N common-mode inductors having a total common mode inductance value and an integer number N differential mode inductances having a differential mode inductance value, and where a ratio of the common mode inductance value to the differential mode inductance value for the integrated choke assembly is greater than 35.

21. The integrated choke assembly of claim 19, where a ratio of the branch portion width dimension to the outer portion width dimension is around 1.5.

22. The integrated choke assembly of claim 8, wherein the core structure is magnetic.

23. The integrated choke assembly of claim 9, wherein the core structure is magnetic.

24. The integrated choke assembly of claim 13, where the core structure comprises a plurality of laminations with each lamination being a single piece including an outer structure with an integer number N outer portions having an outer portion width dimension and an integer number N branch portions having a branch portion width dimension.

25. The integrated choke assembly of claim 12, where the core structure comprises a plurality of laminations with each lamination being a single piece including an outer structure with an integer number N outer portions having an outer portion width dimension and an integer number N branch portions having a branch portion width dimension.

26. The integrated choke assembly of claim 8, where the branch portion width dimension of each branch portion is greater than the outer portion width dimension.

* * * * *